Dec. 20, 1960 P. G. BENNETT 2,964,868
COMBINATION FISHING ROD HOLDER AND HOOK-SETTING APPARATUS
Filed April 4, 1958 2 Sheets-Sheet 1
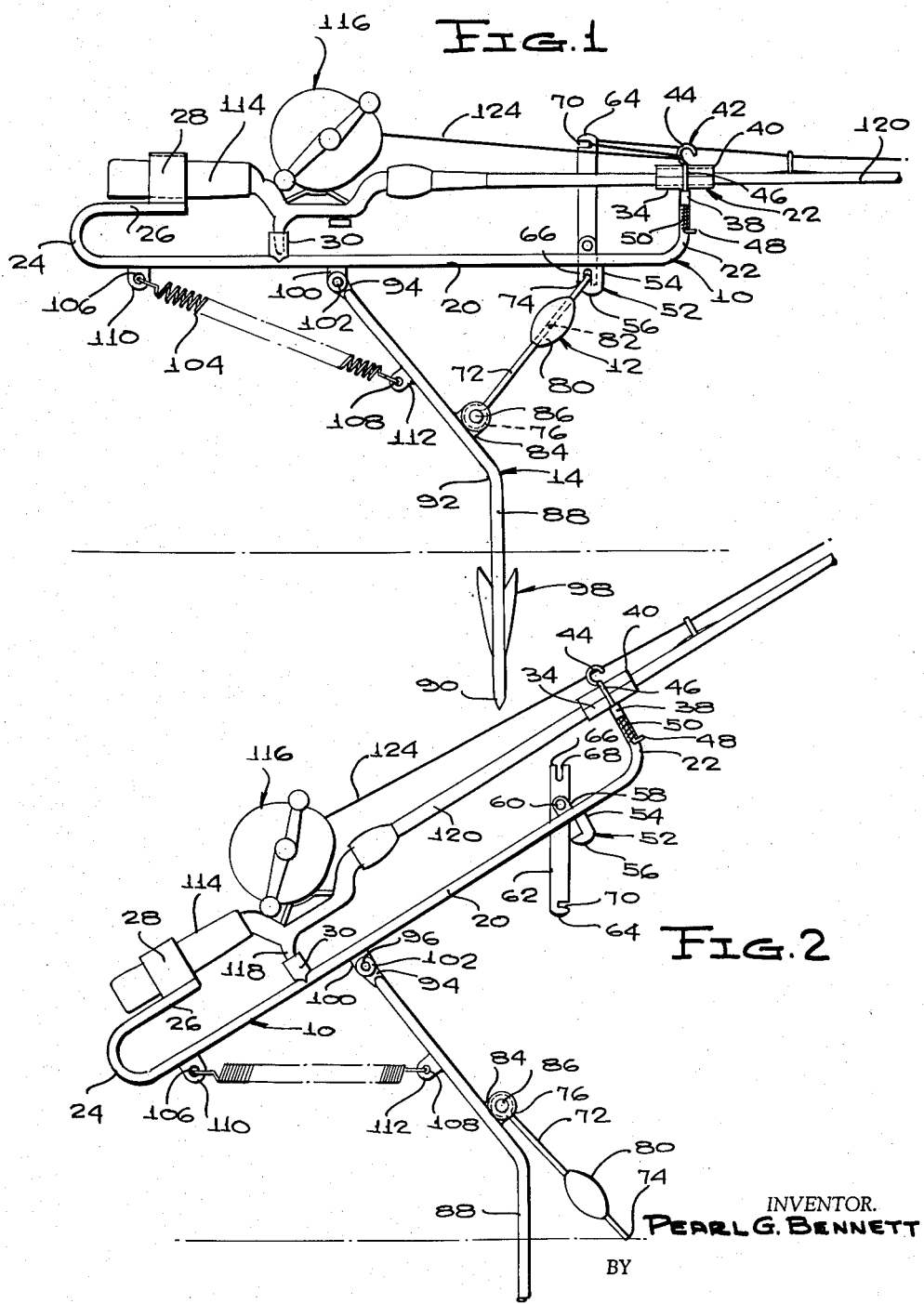
INVENTOR.
PEARL G. BENNETT
BY
McMorrow, Berman & Davidson
ATTORNEYS

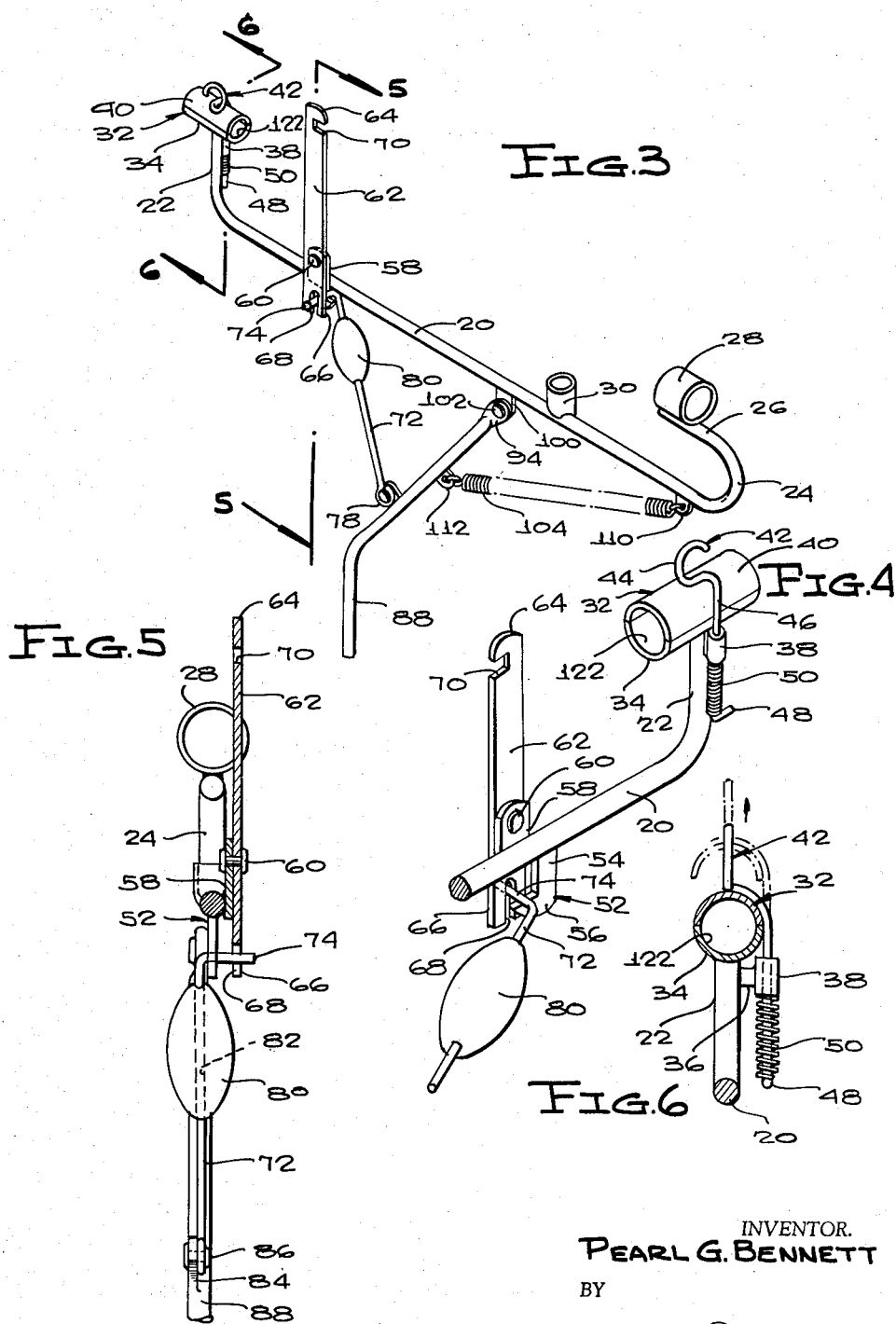

United States Patent Office 2,964,868
Patented Dec. 20, 1960

2,964,868

COMBINATION FISHING ROD HOLDER AND HOOK-SETTING APPARATUS

Pearl G. Bennett, Box 256, Holyrood, Kans.

Filed Apr. 4, 1958, Ser. No. 726,581

3 Claims. (Cl. 43—15)

This invention relates to an improved appliance for holding a fishing rod, the appliance being of the class of fishing rod holders which automatically sets a fishhook in the mouth of a fish in response to the action of a fish in taking the bait presented thereon.

A primary object of this invention is to provide an improved appliance of the class described comprising an elongated rod holder assembly, an automatically releasable latch assembly which is responsive to a tug or a pull on the fishing line, and a spiked support pivotally connected to the rod holder.

A further object is to provide a device of this general type which is responsive only to the pull created by a biting fish and not to elemental conditions which often cause needless resetting of devices which are less positive in operation.

A still further object is to provide a rod holder conforming to the above objects, the rod holder being non-complex in construction or assembly, inexpensive to manufacture and durable in use.

Other and further objects and advantages will become more readily apparent from a consideration of the following specification and drawings, in which:

Figure 1 is a side elevational view of a rod holder constructed and assembled in accordance with the teachings of this invention, the device having a fishing rod and line therein and being in its "cocked" position;

Figure 2 is a fragmentary side elevational view similar to that shown in Figure 1, but showing the device in its "released" position;

Figure 3 is a fragmentary perspective view of the device with the fishing rod removed therefrom, but showing the "cocked" position of the latch assembly;

Figure 4 is an enlarged fragmentary perspective view of one end of the rod holder and a portion of the latch assembly;

Figure 5 is an enlarged fragmentary detailed cross-sectional view taken along the vertical plane of the line 5—5 of Figure 3, looking in the direction of the arrows; and, Figure 6 is an enlarged fragmentary detailed cross-sectional view of the end of the rod holder having shaft-gripping means and a line holder element, taken along the vertical plane of the line 6—6 of Figure 3, looking in the direction of the arrows.

Attention is now directed to the accompanying drawings wherein the three major elements of the device are designated, in general, as follows: reference numeral 10 is applied to the rod holder assembly; numeral 12 identifies the latch assembly, and numeral 14 terms the support member.

The rod holder assembly 10 comprises a substantially cylindrical main body portion 20 having an upright end 22 substantially perpendicular thereto and an opposed curved end 24. The curved end 24 has an integral extension 26 positioned substantially parallel to the main body portion 20 which serves as a support for an elongated, annular rod butt grip 28.

The main body portion 20 is also provided with a substantially cylindrical, hollow pistol grip point retainer 30, the major axis thereof being substantially perpendicular to the major axis of the main body portion 20.

The upright end 22 of the main body portion 20 terminates at the juncture thereof with an elongated, substantially semicircular shaft or tip securing member 34 forming a part of the tip gripping means 32 of the device. Perpendicular to the upright end 22, and immediately subjacent the member 34, is a substantially cylindrical support 36 (Figure 6) providing connection with an annular band 38. As is seen in the drawings, the major axis of the band 38 is substantially parallel to the major axis of the upright end 22. A second elongated, substantially semi-circular member 40 is fixedly connected, as by welding, to a line hook 42. The line hook 42 is formed of a single piece of cylindrical stock and comprises a hook portion 44, bent so that a line passing through the center of the hook 42 is substantially parallel to the longitudinal axis of the main body portion 20. The line hook 42 further includes a substantially cylindrical plunger member 46 and activating projection 48. The hook 42 is constantly biased in the direction of the main body portion 20 by a helicoidal spring 50 surrounding the plunger member 46.

The latch assembly 12 comprises a substantially L-shaped lip member 52 depending from the main body portion 20 and having a leg 54 and a foot 56, for a purpose to be described below. Positioned on the side of the main body portion 20, and fixedly secured thereto, at a point in substantially vertical alignment with the foot 56, is a substantially rectangular plate 58 which is provided with a rivet 60 or other means for pivotally connecting the plate 58 with an elongated substantially rectangular latch 62. The latch 62 has a pair of opposed ends 64, 66, the end 64 being termed the "top" end and the end 66 being termed the "bottom" end, for purposes of description only.

As is seen in the drawings, the bottom end 66 is provided with a longitudinally extending slot 68, while the top end 64 is provided with a transversely extending slot 70. Extending from the support member 14, and pivotally connected thereto, is a substantially cylindrical drop member 72 having an end 74 bent perpendicular thereto and an opposed end 76 bent into an annular ring 78. The drop member 72 is provided with a substantially ellipsoidal weight 80 constructed of lead or some other heavy material and having an axial bore 82 therethrough through which the member 72 passes and is frictionally held. Pivotal connection of the drop member 72 to the support 14 is effected by a substantially rectangular plate 84, affixed to the support 14, having a rivet 86 or other means passing therethrough and also through the ring 78 in order to secure the member 72 thereto.

The support means 14 comprises a substantially cylindrical spike member 88 having a pointed end 90 and being bent obliquely at 92. The opposed end 94 thereof is flattened and is provided with an opening 96 therethrough. A plurality of triangular projections 98 extend from the member 88 adjacent the pointed end 90 thereof in order to afford a firm support when the end 90 is thrust into the ground.

The rod holder assembly 10 is pivotally connected to the support member 14 by means of a substantially rectangular plate 100 depending from the main body portion 20 and having a rivet 102 passing therethrough and also through the opening 96 in the plate member 88. The plate 100 is positioned at a point between the midpoint of the main body portion 20 and the end 24 thereof. A helicoidal spring 104 is positioned between the main body portion 20 and the spike member 88, being releasably secured in openings 106, 108 formed in plates 110, 112 depending from the main body 20 and the spike member 88, respectively.

In operation, after casting the fishing line into the water, the butt portion 114 of a conventional bait casting fishing rod and reel 116 is fitted into the annular band 38 and the pistol grip point 118 is placed in the point retainer 30. The user then exerts pressure against the activating projection 48 of the line hook 42, thus causing the semi-circular member 40 to diverge from the member 34. The shaft or tip 120 of the rod and reel 116 is then placed within the opening 122, thus created, and the pressure on the activating projection is released, causing the tip 120 to be entrapped therein. As a final step in preparing the apparatus for operation, the line 124 is first looped around the hook 44 and then around the slot 70 in the top end 64 of the latch 62 (the latch 62 being pivoted to the required position), the rod holder assembly 10 is then depressed against the pressure of the spring 104 and the end 74 of the drop member 72 is placed in the slot 68 in the bottom end of the latch 62. The end 74 is then rested upon the foot portion 56 of the L-shaped support 52 and, so long as no unusual amount of pressure is exerted against the line, the apparatus remains in this "cocked" position.

The device is responsive to the bite or tug of a fish in the following manner: When the fish bites, pressure is exerted against the line 124, thus pulling the top end 64 in the direction of the end 22 of the main body portion 20. The end 74 of the drop member 72 is lifted from the foot portion 56 of the L-shaped support 52 and thrown from the slot 68, the weight 80 causing it to fall to the ground. The spring 104 then contracts in a sudden upward motion to the shaft 120, thus jerking the line and firmly implanting the hook in the mouth of the fish. The fishing rod may then be dismounted from the apparatus and the fish reeled to the net in the conventional manner.

Having described and illustrated a single embodiment of this invention in some detail, it will be understood that the description and illustration are offered merely by way of example, and that this invention is to be limited only by the scope of the appended claims.

What is claimed is:

1. An improved fishing rod holder and hook setting apparatus for use with a fishing rod assembly which includes a shaft, a reel, and a line, the apparatus comprising an elongated main body portion having a pair of opposed ends, one of said ends being substantially perpendicular to said main body portion and the other of said ends being reverted over and spaced therefrom to form a substantially parallel extension thereof, rod butt grip means fixedly secured on said extension, means on said perpendicular end of said main body portion for releasably holding the shaft of said fishing rod, a ground support pivotally connected to said main body portion, resilient means connected between said other end of said main body portion and said ground support, said resilient means constantly biasing said other end of said main body portion for rotation towards said support, latch means for holding the body portion in a generally horizontal location against the action of the resilient means comprising a substantially L-shaped support depending from said main body portion, said L-shaped support including a leg member and a foot member, an elongated substantially rectangular latch lever having a longitudinally extending slot extending inwardly from an end thereof and a transversely extending line receiving slot adjacent the opposed end thereof, said latch member being pivotally connected to said main body portion adjacent said perpendicular end and being adapted to be substantially vertically disposed in a location with the longitudinally extending slot in transverse alignment with the L-shaped support, a drop member having an end pivotally connected to said support and its other end normally engaging said foot portion and extending into said longitudinal slot, and a line hook fixedly secured on said perpendicular end of said main body portion, the line being reverted about said line hook and connected in the transverse slot in said latch lever whereby a pull against the line is effective to pivot the latch lever and to disengage the drop member from the foot portion and the longitudinal slot whereby the resilient means pivots the main body portion from its horizontal position to an inclined position.

2. In a combination fishing rod holder and hook setting apparatus having an elongated main body portion including a pair of opposed ends, rod butt gripping means fixedly secured to one of said ends, means on the other of said ends for releasably holding the shaft of a fishing rod, and an elongated ground support pivotally connected to said main body portion intermediate its ends, resilient means connected to said ground support and said main body portion adjacent one end thereof to constantly bias said one end for rotation towards said support; that improvement which comprises a latch assembly for holding said main body portion in a selected position against said bias of said resilient means, said latch assembly comprising a substantially L-shaped support, said L-shaped support including a leg member and a foot member, said leg member being fixedly secured to and depending from said main body portion adjacent said other end thereof, said leg and foot members and said main body portion defining a support slot opening towards said ground support, an elongated substantially rectangular latch lever having a longitudinally extending lever slot extending inwardly from an end thereof and line receiving means adjacent the opposed end thereof, said lever being pivotally connected to said main body portion adjacent said L-shaped support, said lever being pivotal to a position wherein said lever slot is transversely aligned with said support slot, and a drop member having one of its ends pivotally connected to said ground support and an opposed end provided with a substantially perpendicular extension, a weight intermediate the ends of said drop member, said extension being engageable in said support slot and said lever slot to hold the drop member in place, whereby pivotal movement of the latch lever responsive to force applied to the line receiving means thereof is effective to pivot the lever to thereby release the drop member and to free the main body portion for movement of said one end thereof toward said ground support.

3. The improvement of claim 2 wherein said ground support is provided with a plurality of triangular projections adjacent its distal end, the triangular projections each having their apices adjacent the lower end of the ground support and their base ends spaced upwardly therefrom to prevent displacement of said ground support when forced into the earth.

References Cited in the file of this patent

UNITED STATES PATENTS

| | | |
|---|---|---|
| 2,295,250 | Zenewich | Sept. 8, 1942 |
| 2,624,536 | Herzog | Jan. 6, 1953 |
| 2,642,690 | Soenksen | June 23, 1953 |
| 2,693,660 | Nebergall et al. | Nov. 9, 1954 |
| 2,784,516 | Barnes et al. | Mar. 12, 1957 |
| 2,804,277 | Kinder | Aug. 27, 1957 |